Dec. 8, 1931.                A. L. VARCIN                1,835,680
         REVERSIBLE DEVICE FOR THE TRANSFORMATION OF
           RECIPROCATING MOTION INTO CIRCULAR MOTION
                     Filed Sept. 14, 1926
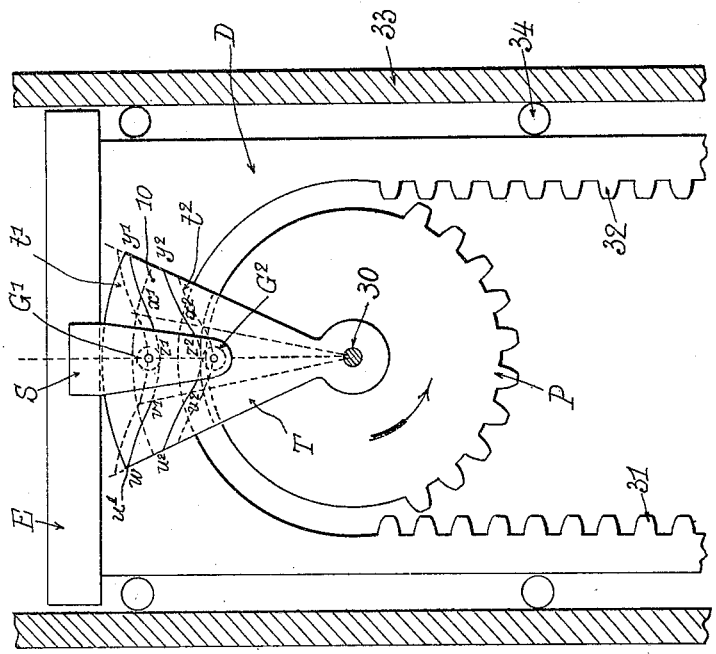
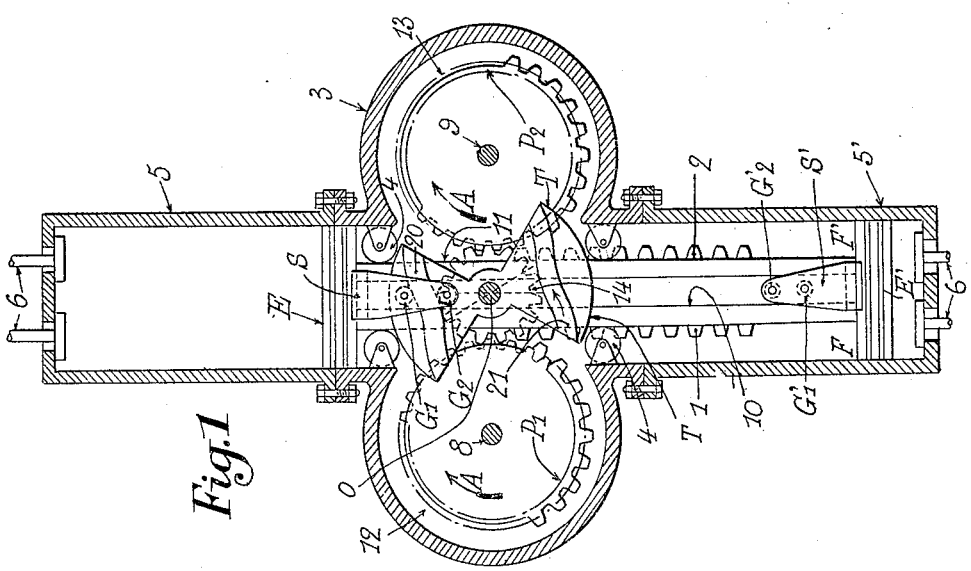
INVENTOR
Adolphe Leopold Varcin
by
ATTORNEY Patented Dec. 8, 1931

1,835,680

UNITED STATES PATENT OFFICE

ADOLPHE LÉOPOLD VARCIN, OF LENS, FRANCE

REVERSIBLE DEVICE FOR THE TRANSFORMATION OF RECIPROCATING MOTION INTO CIRCULAR MOTION

Application filed September 14, 1926, Serial No. 135,369, and in France September 16, 1925.

The present invention relates to a reversible device for transforming a reciprocating motion into a circular motion of the type comprising two racks connected with the reciprocating member, a rotating member having toothed parts adapted to mesh alternatively with the one or the other of said racks, and cam and roller damping contrivance adapted to assure the proper mechanical connection between them at both ends of a stroke of the reciprocating member.

Damping means of the general type embodying a cam and a cam-follower respectively associated with the alternating and rotary members of such a device have been already proposed but experience has shown that such means were inoperative, specially in case of high speeds, such as the speeds of internal combustion engines, because of the shocks happening at the transition points when the drive of the rotary member passes from one rack to the cam and roller contrivance or from this latter to the other cam.

One object of the invention consists in providing an arrangement of cam and cam followers which will obviate all shocks at the instant when the rotating member releases one of the racks, i. e. at the beginning of a dead time and at the instant when the rotating member starts to mesh with the other rack, i. e. at the end of said dead time.

Another object of the invention consists in providing damping means of the type above mentioned which will further provide for a positive connection between the reciprocating and rotary members during the dead time when the toothed part of the rotary member does not engage any of the racks.

Further characteristics of the invention will be set forth in the following description, with reference to the appended drawings, which show, by way of example, various possible embodiments of the invention.

Fig. 1 is a vertical axial section of a first embodiment of the invention.

Fig. 2 is a partial section of a modification.

Fig. 3 is a partial diagrammatical view showing the shape of the cam member.

It is herein supposed that the device according to the invention is used for converting, into a circular movement, the rectilinear reciprocating motion of a piston movable in an engine cylinder, but it is obvious that the same device may also be used, for example in the case of a pump, for converting the circular motion of a driving pinion into a straight motion, so as to reciprocate the piston pump.

As shown in Fig. 1, the engine comprises two cylinders 5, 5' coaxially mounted on a casing 3 having suitable apertures opening into said cylinders. Extending through said apertures are two racks 1, 2, secured at their ends to pistons E, E' slidably mounted in said cylinders. 6 denotes the usual valves. Racks 1, 2 are provided on their outer faces with toothed portions and are spaced apart thus providing a longitudinal slot 10. The tooth rows of the racks extend upon a portion only of the width of the racks, thus leaving guiding rails 11 cooperating with rollers 4 rotatably supported by brackets provided on the inner wall of casing 3.

The casing 3 is formed with two lateral cylindrical chambers adapted to receive segment gears of same diameter $P^1$ and $P^2$ adapted to mesh alternatively and respectively with racks 1 and 2. Said segment gears are keyed on shafts 8 and 9 journalled in the end walls of casing 3. On said shafts are also keyed gear wheels 12 and 13 of the same diameter as the segment gears $P^1$, $P^2$.

Through slot 10 extends a shaft O upon which is keyed a gear wheel 14 in meshing engagement with gear wheels 12 and 13, whose diameter is half the diameter of the latter. Secured to shaft O is a cam member T comprising two opposite sector shaped parts, each provided with a curved boss 20, 21 whose outline will be described with reference to Figs. 2 and 3.

Each piston E, E' carries a bracket S, S' rotatably supporting a pair of cam followers or rollers $G_1$, $G_2$, $G'_1$, $G'_2$ whose axes are parallel to the axis of shaft O, in a plane passing through the cylinder axis.

The operation of this device is as follows:

It is assumed that the initial position is that shown in Fig. 1, the piston E being at the power stroke, and moving to its lower dead center. Pinions $P_1$ and $P_2$ and racks 1 and 2 are out of gear and rollers $G_1$, $G_2$ are rolling respectively upon the upper and lower faces of boss 20. Due to the momentum of segment gears $P_1$ $P_2$ and gear wheels 12, 13, which are rotating in the direction of arrow A, cam member T tends to rotate in the reverse direction. Moreover due to the concave shape of the upper face or track of boss 20, the pressure, transmitted from piston E through bracket S and roller $G_1$ to boss 20 has a tangential component which also tends to rotate cam member T in the direction contrary to arrow A.

When piston E reaches the lower dead center, piston E' begins its power stroke, and the racks 1, 2 are moved upwardly. Roller $G_2$ bears now upon the right hand part of the lower face or track of boss 20, and due to the convex shape of said lower face or track, a tangential component is produced, tending, as before, to rotate cam member T in the direction contrary to arrow A.

Due to the rotation of cam member T, under the pressure which is successively exercized by controllers $G_1$ and $G_2$, gear wheel 14 drives gear wheel 13 in a continuous manner in the direction of arrow A until the forward teeth of segment gear $P_2$ engages the upper teeth of rack 2. From this instant, segment gear $P_2$ is directly driven by rack 2, until piston E reaches its upper dead center. Simultaneously, cam member T is rotated by gear wheels 13 and 14, and the right hand end of boss 20 leaves rollers $G_1$ and $G_2$. Slightly before a complete revolution is performed, boss 21 engages between rollers $G'_1$ and $G'_2$ which are near the upper limit of their stroke and segment gear $P_2$ ceases to mesh with rack 2. The position now assumed by the device is exactly the same as shown in Fig. 1, provided the latter is looked at upside down. It will be readily understood that the downward stroke of piston E takes place in the same manner as above explained, and that segment gears $P_1$ and $P_2$ alternatively mesh with their respective racks, while always rotating in the same direction.

Fig. 2 diagrammatically shows another embodiment of the invention and as drawn at a larger scale in order to show more clearly the outline of the curved boss, which will be hereinafter described. The two inner racks 31 and 32 herein form the opposite sides of a rigid frame D secured to the piston or other reciprocating member E and adapted for lengthwise motion in the casing 33, the motion of said frame being guided by rollers 34. A segment gear keyed on a shaft 30 journalled in casing 33 carries teeth extending upon an arc which is less than 180 degrees, in a number corresponding to the number of teeth of each rack 31—32; during its rotation, which is always in the same direction, pinion P alternately engages the respective racks.

To facilitate the change in the direction of the reciprocating motion, a bracket S is secured as in the preceding case to the reciprocating member E and carries rollers $G_1$ $G_2$. As in the case of Fig. 1, the rollers mounted upon the member S are caused, at each change in the direction of motion of the reciprocating member, to engage the two rolling tracks $u^1$ $v^1$ $z^1$ $x^1$ $y^1$ and $u^2$ $v^2$ $z^2$ $x^2$ $y^2$ of suitable shape which are formed upon the inner periphery and the outer periphery of the projection or boss 10 secured to the cam T which herein comprises only one sector shaped part.

Each track comprises three curved portions $u^1$ $v^1$, $v^1$ $x^1$, $x^1$ $y^1$ for the first and $u^2$ $v^2$, $v^2$ $x^2$, $x^2$ $y^2$ for the other.

These curves are so determined that, as shown in Fig. 3, the center of the corresponding roller will follow the path $u$ $v$ $z$ $x$ $y$ which is drawn in the following manner.

The angle $u$ 0 $v$ corresponds (this not being an absolute limit) to a rotation of the segment gear P which is at least equal to that which takes place between the moment when for instance the axis of the last segment gear tooth is perpendicular to the longitudinal axis of the frame, and the moment when the tooth has just released the rack; the portion of the straight line $u$ $w$ is equal to the lengthwise displacement of the rack during the same time, and the curve $u$ $v$ is then formed according to the resultant of the rotation of the segment gear and the straight motion of the rack when these members are still in mesh. Each point of this curve is obtained as the intersection of a radius 0 $m$ with a circumference having as its radius the distance 0 $u$ minus the distance $u$ $n$ through which the rack moves for a rotation of the segment gear through the angle $u$ 0 $m$.

The curve $x$ $y$ is symmetrically formed in a similar manner; the first segment gear tooth being engaged with the other rack, whereby the mechanism can be operated in either direction in the same conditions.

The angle $v$ 0 $x$ thus corresponds to a rotation of the segment gear which is equal to that which takes place between the time when the last pinion tooth releases the corresponding rack, and the time when the first tooth comes into engagement with the opposite rack. This is a dead time which, if the curve $v\ x$ is an arc of a circumference whose radius is $0\ v$, corresponds to a completely stationary position of the piston at the ends of its stroke. But this dead time may be utilized in order to slacken the speed of the piston at the end of its stroke. For this purpose instead of suddenly stopping the motion of the piston when the center of roller G is at $v$ and to keep it stationary during the rotation $v\ 0\ x$ of the segment gear, a small additional motion of the piston, in the same direction as that of the stroke which has just been performed, is afforded. The curves $u\ v$ and $x\ y$ are therefor tangentially connected to one another by a curve portion $v\ z\ x$ of suitable concave or convex shape.

The curvature of this part $v\ z\ x$ may be variable according to the desired degree of retardation for the end of the stroke of the piston, as will be further explained.

Due to the shape of the curve $v\ z\ x$, the piston will not stop when the center of roller G is at $v$ but will still move on in a gradually retarded manner after the release of the rack, for a distance whose maximum value is equal to the difference between the radii $0\ v$ and $0\ z$.

Further the starting of the straight motion of the opposite rack will thereby be effected in a much more progressive manner from $z$.

The part $v^2$, $z^2$, $x^2$ of the ramp $u^2$, $v^2$, $z^2$, $x^2$, $y^2$ is thus the only part which is operative during the change in the direction of motion of the reciprocating member, and its work is obviously the greater as the motion is the more rapid. It is therefore advantageous that this part shall be given the maximum surface by increasing its length, that is either by increasing its distance from the centre 0, or by increasing the angle $v\ 0\ x$; its width can also be readily augmented.

The angle $v\ 0\ x$ can obviously be increased by eliminating one or more of the pinion teeth; but this will necessarily bring about a corresponding diminution of the length of the piston stroke. If this latter is not to be changed, the diameter of the pinion must be correspondingly increased.

The end parts $u$, $v$ and $x$, $y$ of the curve being tangentially connected by the part $v\ z\ x$, the curvature of this latter part will thus essentially depend upon the distance between the points $v$ and $x$ and upon the direction of the tangents to the end parts at these two points. When, as is the case in the drawings, the points $v$ and $x$ are relatively near one another, i. e. when the angle $v\ 0\ x$ is relatively small, it will be seen that the part $v\ z\ x$ is concave. But should it be desired, for the above reasons, to increase the angle $v\ 0\ x$, or to increase the length of its sides by placing the rollers farther from the centre 0, the connecting part $v\ z\ x$ will be convex and will form with the end parts $u\ v$ and $x\ y$ a "basket-handle" curve.

Since the degree of retardation obtained for the end of the stroke of the piston obviously depends upon the curvature of the part $v\ z\ x$, it will be seen that the desired degree of retardation will be obtained by varying the angle $v\ 0\ x$ or the distance of the rollers from the centre 0.

It should be noted however that since the axes of the two rollers $G^1$ $G^2$ are at a relatively great distance apart, the two curves $t^1$, $t^2$ representing the geometrical loci of the projection of the two axes upon the cam will not be parallel, and the curve $t^1$ corresponding to the outer roller $G^1$ will have a smaller curvature than the curve $t^2$ corresponding to the inner roller $G^2$. The ramps $u^1\ y^1$ and $u^2\ y^2$ are respectively parallel with the curves $t^1$ and $t^2$ and their distance from the said curves is equal to the radius of the rollers.

In this manner, both rollers $G^1$, $G^2$ will stay in rolling contact with the corresponding tracks and will always rotate in the same direction, so that the play, even though small which is necessary when using a single roller rolling alternately upon two ramps placed on either side of its axis, can thus be eliminated. This insures a positive connection between the reciprocating and rotary members during the dead time when the segment gear does not engage any of the racks.

Instead of using two rollers adapted to roll upon the outer and inner tracks of the boss 10 of the cam secured to the rotatable element, use may be made of two rollers which are adapted to roll upon two rolling tracks formed by the edges of a groove provided in the cam T, both rollers engaging said groove simultaneously.

For reasons of symmetry and equilibrium, it may be advisable to provide a set of cam and rollers upon each face of the frame D on either side of the pinion.

The shape of the rolling tracks of bosses 20 and 21 of Fig. 1, which is shown in a diagrammatical manner, is obviously determined in the same manner as above described with reference to Figs. 2 and 3. Two bosses are provided so as to better balance the rotating cam. Moreover, the cam T rotates at a speed which is twice the speed of the segment gears $P_1$ and $P_2$, whereby the length of the tracks may be twice the length of the tracks of boss 10 (Fig. 2).

It will be seen that, with the arrangement of Fig. 1, the inner width of the frame is reduced to the diameter of the shaft 0, the cam being situated out of the plane of the frame, and the weight of the members to which a reciprocating motion is imparted is reduced to a minimum.

Obviously, the present invention is not limited to the constructions hereinabove described, which are given solely by way of example, and many modifications in detail may be made without departing from the principle of the invention.

Having now described my invention what I claim as new and desire to secure by Letters Patent is:

1. A reversible device for transforming reciprocating motion into rotary motion and vice versa, including the combination, with toothed rotary cooperating means and a toothed rotary member meshing therewith, and a reciprocable member having toothed cooperating means rigidly associated with and reciprocating with the same intermittently engaged by said rotary toothed cooperating means, of a cam and follower apparatus arranged to operate solely while said rotary toothed cooperating means initially and fully meshes with and disengages from said reciprocating toothed cooperating means, including a cam follower associated with one of said toothed cooperating means so as to move therewith, and a ramp engageable by said cam follower, which is movable with the other cooperating means and provided with two symmetrical end portions whose outline form in each case is generally parallel with a path described by a point when the same is moved rigidly with said reciprocating member while said latter member and said toothed rotary member are uniformly moved relatively to each other as when normally in mesh, which point is located in a plane dividing said device symmetrically in two when said toothed rotary member is so disposed as to be simultaneously divided by said plane in two symmetric parts and also coinciding with the center of said cam follower, said point having a radius substantially equal to the distance from the outline form of one of said symmetrical end portions to the line generally parallel therewith for said cam follower.

2. A reversible device for transforming reciprocating motion into rotary motion and vice versa and for avoiding dead center effects, including the combination, with toothed rotary cooperating means and a toothed rotary member meshing therewith, and a reciprocable member having toothed cooperating means rigidly associated with and reciprocating with the same intermittently engaged by said rotary toothed cooperating means, of a cam and follower apparatus arranged to operate solely while said rotary toothed cooperating means initially and fully meshes with and disengages from said reciprocating toothed cooperating means, including a cam follower associated with one of said toothed cooperating means so as to move therewith, a ramp engageable by said cam follower which is movable with the other cooperating means and provided with two symmetrical end portions whose outline form in each case is generally parallel with a path described by a point when the same is moved rigidly with said reciprocating member, while said latter member and said toothed rotary member are uniformly moved relatively to each other as when normally in mesh, which point is located in a plane dividing said device symmetrically in two when said toothed rotary member is so disposed as to be simultaneously divided by said plane in two symmetric parts, and also coinciding with the center of said cam follower, said point having a radius substantially equal to the distance from the outline form of one of said symmetrical end portions to the line generally parallel therewith for said cam follower, and an intermediate central portion upon said ramp between said end portions having an outline form generally parallel with a line described by said point during gradual damping of the movement of said reciprocating member when said rotary toothed cooperating means is disengaged from said reciprocating toothed cooperating means and also during gradual acceleration of said reciprocating member in the opposite direction when said rotary tooth cooperating means are in a position to be initially engaged with said reciprocating toothed cooperating means.

3. A reversible device for transforming reciprocating motion into rotary motion and vice versa and for avoiding dead center effects, including the combination, with toothed rotary cooperating means and a toothed rotary member meshing therewith, and a reciprocable member having toothed cooperating means rigidly associated with and reciprocating with the same intermittently engaged by said rotary toothed cooperating means, of a cam and follower apparatus arranged to operate solely while said rotary toothed cooperating means initially and fully meshes with and disengages from said reciprocating toothed cooperating means, including a cam follower associated with one of said toothed cooperating means so as to move therewith, a ramp engageable by said cam follower which is movable with the other cooperating means and provided with two symmetrical end portions whose outline form in each case is generally parallel with a path described by a point when the same is moved rigidly with said reciprocating member, while said latter member and said toothed rotary member are uniformly moved relatively to each other as when normally in mesh, which point is located in a plane dividing said device symmetrically in two when said toothed rotary member is so disposed as to be simultaneously divided by said plane in two symmetric parts, and also coinciding with the center of said cam follower, said point having a radius substantially equal to the distance from the outline form of one of said symmetrical end portions to the line generally parallel therewith for said cam follower, and an intermediate central portion comprising two symmetrical parts merging together on the plane of symmetry, disposed upon said ramp between said end portions, each part having an outline form positively varying the motion of said reciprocable toothed cooperating means when the same are clear and disengaged from the rotatable toothed cooperating means.

4. A reversible device for transforming reciprocating motion into rotary motion and vice versa, including the combination, with a reciprocating member and a pair of rotary means, of a pair of racks associated rigidly with said reciprocating member having their teeth turned outwardly in opposite directions, a toothed portion on each of said two rotary means arranged to alternately mesh with a corresponding rack of said pair, a rotary member rotatable upon an axis spaced between said racks and operatively connected to said rotary means so as to rotate therewith, and a cam and follower apparatus adapted to operate when said racks and the toothed portions of said rotary members are out of contact and also mutually disengaging and initially meshing, including a cam follower associated with one of said members, a ramp adapted to move with the other member and comprising two symmetrical end portions having in each case an outline form generally parallel with the path described by a point moving rigidly with said racks with respect to said toothed rotary means, while said racks and rotary toothed means are uniformly moved relatively to each other as when normally in mesh, which point is located in a plane dividing said device symmetrically in two when said rotary member is so disposed as to be simultaneously divided by said plane in two symmetric parts and also coinciding with the center of said cam follower, said point having a radius for said cam follower substantially equal to the distance from the outline form of one of said symmetric end portions to the line generally parallel therewith.

5. A reversible device for transforming reciprocating motion into rotary motion and vice versa, including the combination, with toothed rotary cooperating means and a toothed rotary member meshing therewith, and a reciprocable member having toothed cooperating means rigidly associated with and reciprocating with the same intermittently engaged by said rotary toothed cooperating means, of a cam and follower apparatus arranged to operate solely while said rotary toothed cooperating means initially and fully meshes with and disengages from said reciprocating toothed cooperating means, including two cam followers associated with one of said toothed cooperating means so as to move therewith, and two ramps engageable by said cam followers, which ramps are formed on the other toothed cooperating means, said ramps being arranged to be respectively and simultaneously engaged by said cam followers at one end of the stroke of said reciprocating member, each of said ramps being provided with two symmetrical end portions whose outline form in each case is generally parallel with a path described by a point when the same is moved rigidly with said reciprocating member while said latter member and said toothed rotary member are uniformly moved relatively to each other as when normally in mesh, which point is located in a plane dividing said device symmetrically in two when said toothed rotary member is so disposed as to be simultaneously divided by said plane in two symmetric parts and also coinciding with the center of one cam follower, said point having a radius for said cam follower substantially equal to the distance from the outline form of one of said symmetrical end portions to the line generally parallel therewith.

6. In a device according to claim 5, wherein the mentioned ramps form the outer and inner sides of a projection upon said one toothed cooperating means carrying the same.

7. A reversible device for transforming reciprocating motion into rotary motion and vice versa and for avoiding dead center effects, including the combination, with toothed rotary cooperating means and a toothed rotary member meshing therewith, and a reciprocable member having toothed cooperating means rigidly associated with and reciprocating with the same intermittently engaged by said rotary toothed cooperating means, of a cam and follower apparatus arranged to operate solely while said rotary toothed cooperating means initially and fully meshes with and disengages from said reciprocating toothed cooperating means, including a cam member adapted to move simultaneously with one of said members, an inner and an outer ramp limiting said cam member, and two cam followers associated with the other member, said cam followers being adapted to simultaneously and respectively engage said ramps on either side of said cam member at one end of the stroke of said reciprocating member, each of said ramps comprising two end portions whose outline in each case is generally parallel with a path described by a point when the same is moved rigidly with said reciprocating member while said latter member and said toothed rotary member are uniformly moved relatively to each other as when normally in mesh, which point is located in a plane dividing said device symmetrically in two when said toothed rotary member is so disposed as to be simultaneously divided by said plane in two symmetric parts, and also coinciding with the center of one of said cam followers, said point having a radius substantially equal to the distance from the outline form of one of said symmetrical end portions to the line generally parallel therewith for the respective cam follower, and an intermediate central portion comprising two symmetrical parts merging together on the plane of symmetry, disposed upon said ramp between said end portions, each part having an outline form positively varying the motion of said reciprocable toothed cooperating means when the same are clear and disengaged from the rotatable toothed cooperating means.

In testimony whereof I have signed my name to this specification.

ADOLPHE LÉOPOLD VARCIN.